(12) United States Patent
Kathman et al.

(10) Patent No.: US 8,529,139 B2
(45) Date of Patent: Sep. 10, 2013

(54) OPTICAL ELEMENT AND SYSTEM USING THE SAME

(75) Inventors: Alan D. Kathman, Charlotte, NC (US); Charles S. Koehler, Concord, NC (US); William H. Welch, Charlotte, NC (US); Eric G. Johnson, Harrisburg, NC (US); Robert D. TeKolste, Charlotte, NC (US)

(73) Assignee: DigitalOptics Corporation East, Charlotte, NC (US)

(*) Notice: Subject to any disclaimer, the term of this patent is extended or adjusted under 35 U.S.C. 154(b) by 20 days.

(21) Appl. No.: 12/805,478

(22) Filed: Aug. 2, 2010
(Under 37 CFR 1.47)

(65) Prior Publication Data

US 2012/0076456 A1   Mar. 29, 2012

Related U.S. Application Data

(63) Continuation-in-part of application No. 12/453,229, filed on May 4, 2009, now Pat. No. 7,769,258, which is a continuation of application No. 12/073,748, filed on Mar. 10, 2008, now Pat. No. 7,529,446, which is a continuation of application No. 11/802,044, filed on May 18, 2007, now Pat. No. 7,343,069, which is a continuation of application No. 10/320,525, filed on Dec. 17, 2002, now Pat. No. 7,221,823, which is a continuation of application No. 09/614,184, filed on Jul. 11, 2000, now Pat. No. 6,496,621, which is a continuation-in-part of application No. 09/329,996, filed on Jun. 11, 1999, now Pat. No. 6,530,697.

(60) Provisional application No. 60/101,367, filed on Sep. 22, 1998.

(51) Int. Cl.
*G02B 6/36* (2006.01)

(52) U.S. Cl.
USPC .............. 385/88; 385/14; 385/33; 385/39

(58) Field of Classification Search
USPC .......................................... 385/33, 36, 89
See application file for complete search history.

(56) References Cited

U.S. PATENT DOCUMENTS

| | | | |
|---|---|---|---|
| 3,809,455 A | 5/1974 | Pekau et al. | |
| 4,045,120 A | 8/1977 | De Corlieu et al. | |
| 4,709,413 A | 11/1987 | Forrest et al. | |
| 4,799,755 A | 1/1989 | Jones | |
| 4,834,484 A | 5/1989 | Gorman et al. | |
| 4,865,409 A | 9/1989 | Althaus et al. | |
| 5,052,772 A | 10/1991 | Okamoto et al. | |
| 5,113,244 A | 5/1992 | Curran | |

(Continued)

FOREIGN PATENT DOCUMENTS

| | | |
|---|---|---|
| EP | 0 595 449 | 5/1991 |
| GB | 2 252 843 | 8/1992 |
| JP | 4-034505 | 2/1992 |
| WO | WO 00/13051 | 3/2000 |

*Primary Examiner* — Eric Wong
(74) *Attorney, Agent, or Firm* — Lee & Morse, P.C.

(57) ABSTRACT

A method for transmitting a signal in an optical system includes generating an optical signal along an optical axis for transmission through an optical element, positioning the optical element so that a surface discontinuity is positioned along the optical axis such that the optical signal defines a substantially radially symmetric intensity profile, and launching the optical signal into an input face of an optical fiber such that the intensity profile is substantially null proximate an optical axis associated with the optical fiber.

6 Claims, 5 Drawing Sheets

(56) References Cited

U.S. PATENT DOCUMENTS

| | | |
|---|---|---|
| 5,117,472 A | 5/1992 | Blyler, Jr. et al. |
| 5,243,681 A | 9/1993 | Bowen et al. |
| 5,278,679 A | 1/1994 | Davis et al. |
| 5,381,499 A | 1/1995 | Takenaka et al. |
| 5,388,171 A | 2/1995 | Michikoshi et al. |
| 5,405,659 A | 4/1995 | Fernandez |
| 5,416,862 A | 5/1995 | Haas et al. |
| 5,504,826 A | 4/1996 | Shibutani et al. |
| 5,557,471 A | 9/1996 | Fernandez |
| 5,638,396 A | 6/1997 | Klimek |
| 5,661,835 A | 8/1997 | Kato et al. |
| 5,696,862 A | 12/1997 | Hauer et al. |
| 5,763,870 A | 6/1998 | Sadler et al. |
| 5,793,489 A | 8/1998 | Kotidis et al. |
| 5,898,802 A | 4/1999 | Chen et al. |
| 5,963,696 A | 10/1999 | Yoshida et al. |
| 5,997,185 A * | 12/1999 | Kropp .............................. 385/89 |
| 6,064,786 A | 5/2000 | Cunningham et al. |
| 6,243,508 B1 | 6/2001 | Jewell et al. |
| 6,264,377 B1 | 7/2001 | Mitsuda et al. |
| 6,504,975 B1 | 1/2003 | Yamagata et al. |
| 6,600,845 B1 | 7/2003 | Feldman et al. |
| 6,822,794 B2 | 11/2004 | Coleman et al. |
| 6,856,460 B2 | 2/2005 | Coleman et al. |
| 6,961,489 B2 | 11/2005 | Cox et al. |
| 7,139,454 B2 | 11/2006 | Cox et al. |
| 7,149,383 B2 | 12/2006 | Chen |

* cited by examiner

OPTICAL ELEMENT AND SYSTEM USING THE SAME

CROSS-REFERENCES TO RELATED APPLICATIONS

The present application is a continuation-in-part of application Ser. No. 12/453,229, filed May 4, 2009, to be issued as U.S. Pat. No. 7,769,258 on Aug. 3, 2010, which is a continuation of application Ser. No. 12/073,748, filed Mar. 10, 2008, now U.S. Pat. No. 7,529,446, which in turn is a continuation of Ser. No. 11/802,044, filed May 18, 2007, now U.S. Pat. No. 7,343,069 B2, which in turn is a continuation of Ser. No. 10/320,525, filed Dec. 17, 2002, now U.S. Pat. No. 7,221,823 B2, which is a continuation of Ser. No. 09/614,184, filed Jul. 11, 2000, now U.S. Pat. No. 6,496,621, which is a continuation-in-part of U.S. patent application Ser. No. 09/329,996, filed Jun. 11, 1999, now U.S. Pat. No. 6,530,697, which claims priority under 35 U.S.C. §119 to Provisional Application No. 60/101,367 filed on Sep. 22, 1998, the entire contents of all of which are hereby incorporated by reference for all purposes.

BACKGROUND OF THE INVENTION

1. Field of the Invention

Embodiments of the present invention are directed to an optical element having both an amplitude diffractive structure and a phase diffractive structure and/or a vortex lens.

2. Description of Related Art

It is very difficult to manufacture a multi-mode fiber with good control over the index of refraction in the center of the fiber. If the light coupled to the fiber excites some modes that propagate mostly in the center of the fiber and other modes which do not propagate mostly in the center of the fiber, very different propagation times for these modes may result. This is referred to as differential mode delay. Differential mode delay tends to spread out the pulse length of signals and reduce the effective bandwidth of the fiber.

Modes which propagate mostly in the center of the fiber are the lower order fiber modes, i.e., modes having small propagation angles that strike at or near the center of the fiber. These lower order modes spend most of the time in the center of the fiber, tend to travel straight down the fiber and the shape of these modes does not change much as they propagate. Therefore, in order to reduce differential mode delay, any light which enters near the center of the fiber needs to be incident at an angle which is large enough not to excite lower order modes, but not so large that the critical angle is exceeded and the light fails to be coupled or no light should be input to the center of the fiber.

One current solution involves coupling light into single mode fibers which are then positioned off-axis relative to the multi-mode fiber. Single mode fibers have a much smaller core than multi-mode fibers, so can be used to provide light at specific positions on the endface of the multi-mode fiber. However, single mode coupling is more expensive than multi-mode coupling and the additional coupling step leads to an increase loss in light. Further, while no light enters the fiber of the center for this configuration, the light will still cross the fiber axis as it propagates, thus increasing the differential mode delay. Additionally, ferrules or other structures housing the multi-mode fiber to a single mode fiber junction are not readily available and must be developed specifically for that purpose.

Another solution is to use a vertical cavity surface emitting laser (VCSEL) excited to radiate in a ring mode. The operation of the VCSEL in radiation modes other than the lowest order have less predictable flux distributions than in the lowest order mode, in which the distribution more closely approximates a Gaussian profile. Further, there will still be some power in the lower order modes of the VCSEL. Additionally, such operation of the VCSEL often requires a higher current to drive the source into the higher radiation modes.

As the use of non-physical contact connections between light sources and fibers increases, the need for effective isolation to prevent light reflected at the fiber interface from being returned to the light source increases. Feedback to the light source may result in spectral broadening, light source instability, and relative intensity noise, which affect the monochromaticity of the light source. As data rates go up, the systems become more sensitive to relative intensity noise and require low bit error rates. Conventional optical isolators using polarization effects to attenuate reflection are very expensive, making the non-physical contact impractical. The importance of avoiding feedback is further increased when trying to use cheaper light sources, such as vertical cavity surfaces emitting laser diodes and light emitting diodes.

One solution that avoids the use of an optical isolator is a mode scrambler that divides power from the light source into many modes. A configuration employing a mode scrambler includes a single mode pigtail that provides light from the light source to the mode scrambler that then delivers the light to a transmission cable via an air-gap connector. Since any reflected power will still be divided across the many modes, any reflected power in the mode that can efficiently be coupled into the pigtail is only a small fraction of the total reflected power, thereby reducing return losses. However, this solution involves aligning another fiber, physically contacting the fiber with the mode scrambler, and placing the light source against the fiber. This pigtailing is expensive. Thus, there still exists a need for true non-physical contact connection between a light source and a transmission system that does not require an isolator.

SUMMARY

Embodiments are therefore directed to an optical element that substantially overcomes one or more of the problems due to the limitations and disadvantages of the related art.

Embodiments may be directed to providing a method for transmitting a signal in an optical system, the method including generating an optical signal along an optical axis for transmission through an optical element, positioning the optical element so that a surface discontinuity is positioned along the optical axis such that the optical signal defines a substantially radially symmetric intensity profile, and launching the optical signal into an input face of an optical fiber such that the intensity profile is substantially null proximate an optical axis associated with the optical fiber.

An axicon function may be provided with respect to the optical signal via the surface discontinuity.

The relative minimum of the incident field amplitude of the intensity profile may be located proximate a center of the intensity profile.

The intensity profile may be substantially symmetric about the relative minimum of the incident field amplitude.

The intensity profile may be substantially annular.

Embodiments may be directed to providing an optical system including an optical element having an input surface, an output surface, and an optical axis, and an optical medium having an end proximate to the output surface of the optical element and an end distal to the output surface of the optical element, the optical medium configured to receive emitted light having a received annular intensity profile and transfer the light to the distal end such that the transferred light substantially retains the received annular intensity profile at the distal end. The output surface may have a continuous slope/curvature in an area approximately between a periphery of the output surface and a first distance from the optical axis. The output surface may have a discontinuity in an area within a perimeter of the first distance for emitting light having an output annular intensity profile receivable at the proximate end of the optical medium.

The optical element may be a mode matching element, wherein light output from the optical element is distributed in a desired angular distribution which is substantially maintained along the fiber for more than a depth of focus of the optical element.

The mode matching element may be a diffractive element or a refractive element.

The optical element may include first and second surfaces, the mode matching element being provided on said second surface, further from the light source. An angular distribution altering element may be on the first surface. The angular distribution altering element may provide a ring pattern on said second surface. The angular distribution altering element may be a diffractive surface having a radially symmetric lens function and a negative axicon function.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
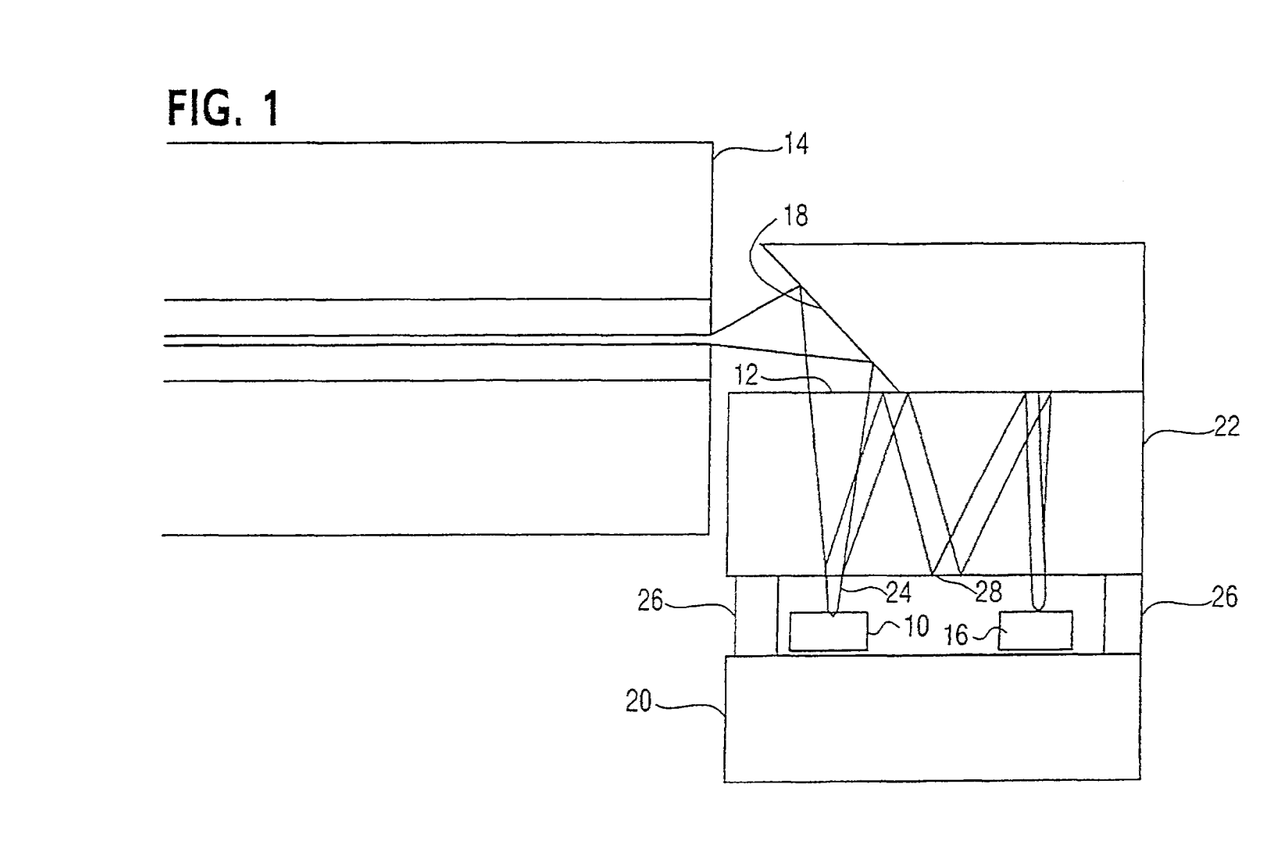
FIG. 1 illustrates the integration of the coupler of an embodiment with a light source, a fiber and a light source power monitor.

FIG. 1 illustrates a light source 10, here a VCSEL, a coupler 12 and a multi-mode fiber 14 integrated with a power monitor 16 and a reflective surface 18 for directing the light into the fiber 14. In particular, the light source 10 and the power monitor 16 are provided on a substrate 20. Another substrate 22 has the coupler 12 thereon, preferably on the face furthest from the light source to allow the beam to expand, and a splitting diffractive element 24 which splits off a portion of the light from the light source 10 to be monitored. The substrates 20, 22 are preferably mounted with spacer blocks 26, which provide the desired separation between the substrates 20, 22. The coupler 12 may also be provided in a common housing with the fiber 14.

The light split off by the diffractive element 24 is directed to the power monitor 16 to monitor the operation of the light source 10. The directed of the light to the power monitor 16 may be achieved by providing appropriately positioned reflective portions 28. The number of times the light to be monitored traverses the substrate 22 is a design choice, depending on the initial angle of diffraction and the desired positioning of the power monitor 16. This monitoring is set forth in commonly assigned U.S. application Ser. No. 09/386,280, entitled "A Diffractive Vertical Cavity Surface Emitting Laser Power Monitor and System" filed Aug. 31, 1999, which is hereby incorporated by reference in its entirety for all purposes. Alternatively, the power monitoring may be realized using an integrated detector, without the need for the deflecting element, as set forth in commonly assigned U.S. application Ser. No. 09/548,018, entitled "Transmission Detection for Vertical Cavity Surface Emitting Laser Power Monitor and System" filed Apr. 12, 2000, which is hereby incorporated by reference in its entirety for all purposes The light that is not split off by the diffractive element 24 proceeds to the coupler 12. A reflective surface 18, such as a polished angular face of another substrate, is provided to direct the light from the coupler 12 into the multi-mode fiber 14. Preferably all the optical elements are formed lithographically and all the elements are integrated on a wafer level.

In accordance with the present invention, the coupler 12 is a diffractive element that matches the phase as well as the intensity distribution of the beam. The matching of the phases generates spiral propagation of the beam through the fiber. This spiral or vortex propagation maintains the intensity profile input to the fiber along the fiber. Since the beam travels in a corkscrew, the amount of light crossing the center of the fiber is significantly reduced. Ideally, the amount of light in the center will be zero, but in practice, the amount of light is on the order of 10% or less. In contrast, when only the intensity distribution is controlled, as in the first two designs of the parent application, the input intensity profile may be the desired profile, but will quickly degrade as the light traverses the fiber, In other words, while the other designs may provide an input profile that is substantially null on axis, this profile is only maintained for the depth of focus of the coupler. When also matching the phase, this profile is maintained substantially beyond the depth of focus of a lens having the same numerical aperture as the beam to be input to the fiber, e.g., at least an order of magnitude longer. Absent the fiber, the null space of the beam profile is maintained through free space, which significantly reduces the alignment requirement. Further, by matching the phase and amplitude of the beam to a certain mode of the fiber, theoretically the beam profile could be maintained over an infinite length of fiber. However, imperfections in the real world, e.g., in the fiber, in the beam, in the matching, degrade from this theoretical scenario.

Thus, in order to avoid low order modes in a GRIN fiber launch, the amplitude and phase of the higher order modes need to be matched. The following equations are set forth in Fields and Waves in Communication Electronics, Simon Ram et al. 1984, particularly pp. 765-768, which is hereby incorporated by reference in its entirety. For a GRIN fiber, these eigenmodes all have the form set forth in Equation (1):

$$E(r,\theta,z) \propto f_{mp}(r) e^{\pm jm\theta} e^{\pm j\beta_{mp}z} \quad (1)$$

where f(r) is a function that depends only on r for given modes within a specific fiber, r is the radius from the axis, θ is the angle from the axis, z is the distance along the axis, m is the azimuthal mode number, β is a propagation constant, p is the radial mode number. When m, p=0, the beam has a Gaussian profile.

While Equation (1) could be used to match a particular mode of the fiber by creating an input light beam having an amplitude and phase function which exactly correspond to the particular mode, such matching is not required and may not even be desirable, as matching the amplitude as well as the phase increases the requirements on the optics. As long as m>0, the azimuthal mode m will have a phase function that is a spiral ring, whether the light is traveling in free space or in a fiber. Once the phase function for at least one higher order mode, i.e., m=0, has been matched, a null at the center of the beam is created after the beam having been phase matched propagates over a short distance, e.g., a few wavelengths. Unlike other types of matching, this null is maintained in the center in both free space and the fiber, so such an optical element providing such matching does not have to be immediately adjacent to the fiber. As evident from Equation (1), when matching the phase, the value of p doesn't matter.

In order to suppress the lowest order mode, i.e., m=0, a phase term needs to be added to the wavefront. This is accomplished through the use of the following diffractive phase function encoded onto the wavefront set forth in Equation (2):

$$\phi(x, y) = m \arctan\left(\frac{y}{x}\right) \quad (2)$$

where Φ is the phase function, x and y are the coordinates in the plane. In general, there will be several modes propagating, e.g., m=1-5. The spiral mode may be realized by matching the phase function for m=3.

This phase function can be added to a lens function and encoded as a mod(2π) diffractive element as set forth in Equation (3):

$$\phi(x, y) = \frac{\pi(x^2 + y^2)}{\lambda f} + m \arctan\left(\frac{y}{x}\right) \quad (3)$$

Figure 2A:
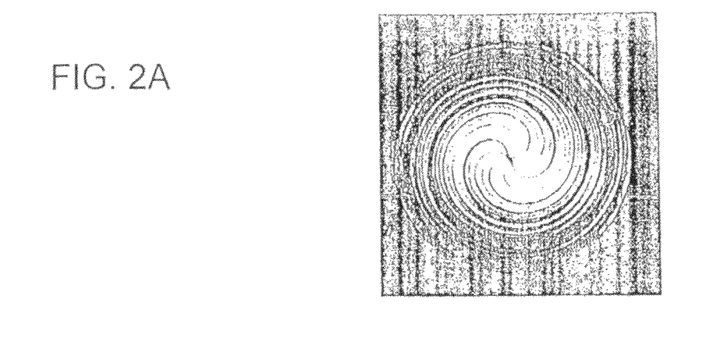
FIGS. 2A-2C illustrate a diffractive element and associated characteristics of a spiral generator for use as the coupler in accordance with an embodiment.
Figure 2B:
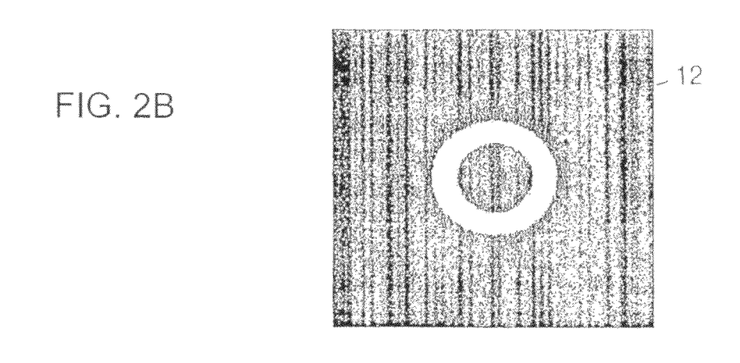
Figure 2C:
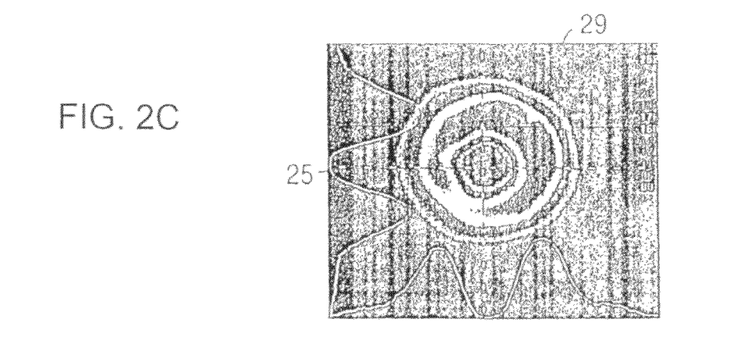

FIG. 2A illustrates the mod(2π) diffractive element and the corresponding intensity to in the focal plane of the lens function. FIG. 2B illustrates an actual example of a diffractive optical element 12 created in accordance with Equation (3). FIG. 2C illustrates the simulated ring intensity 25 and the measured intensity pattern 29 of the element 12 in FIG. 2B. A refractive equivalent in accordance with Equation (3) of the phase matching diffractive 12 may be alternately employed.

This phase matching coupler 12 is not a true beam shaper, since each point in the input plane is mapped into more than one point in the output plane because of the axial singularity. Unlike a diffuser, each point in the input plane is not mapped to every point in the output plane.

The phase matching coupler 12 allows the desired angular distribution to be substantially maintained along a portion of the fiber. This may be quantified by measuring the amount of power within a certain radius of the fiber at a certain distance along the fiber. The phase matching of the present invention allows more power to be contained within the desired radii for a longer distance than methods not employing phase matching. For example, by aligning the coupler and a GRIN fiber along the same axis, using a 850 nm source, and matching both the phase and the amplitude, the encircled energy can be maintained to less than 12.5% is a radius of less than 4.5 microns and 75% for a radius less than 15 microns, with no power in the fiber center, for over 6 m.

By matching the phases, the light from the coupler is input to the fiber traveling in a circular direction, i.e., the path of the light down the fiber forms a corkscrew. Such traversal is opposed to the linear travel normally occurring down the fiber. By traveling in a corkscrew or spiral mode, the input distribution, typically annular, of the input light is maintained along the fiber. Without the phase matching, while the initial input light has the desired shape, this shape is not retained throughout the traversal of the fiber. Therefore, more modal dispersion will be present, with more light in the center of the fiber, if phase matching is not used.

In addition to efficiently coupling the light into the fiber, the phase matching coupler 12 also reduces the power being fedback into the light source 10. Since the phases are matched, and the reflected light will not have the same phase as it did when originally incident on the phase matching coupler 12, the phase matching coupler 12 will not return the light back to the light source as it came. In other words, when the reflected light traverses the system, it will be further deflected by the phase matching coupler 12, thereby reducing the power fedback into the light source 10.

The back reflection reduction of the phase matching coupler only operates sufficiently when the phase matching coupler 12 is far enough away from the fiber so that the phase is sufficiently changed to prevent being redirected in the same manner. In other words, if the phase matching coupler 12 is placed in contact with the end of the fiber, while the coupler will still serve to maintain the input distribution, since the reflected light will have essentially the same phase as the input light, the light will be returned substantially back to the light source as it came. However, if the phase matching coupler 12 is placed at least roughly three times the diameter of the beam incident on the fiber, there is sufficient alteration of the phase due to traversal that the reflect light incident on the phase matching coupler 12 will be further deflected.

Figure 3:
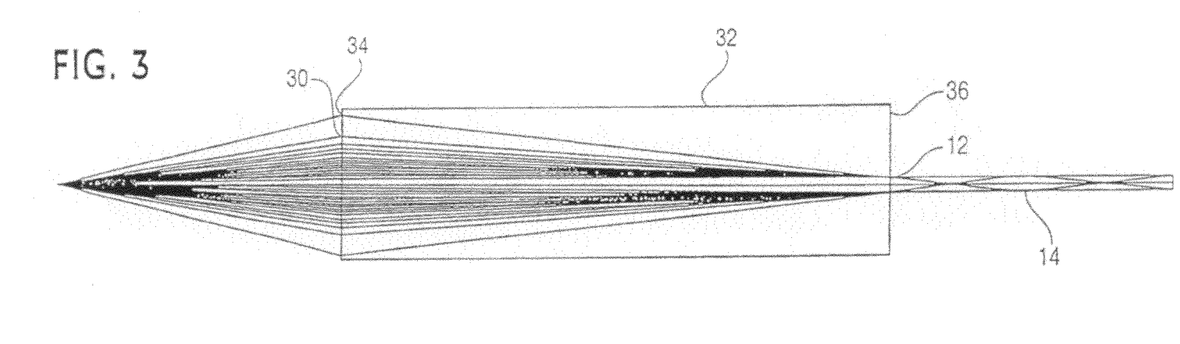
FIG. 3 is a schematic illustration of another embodiment of the coupler.

Further reductions to the amount of light being fedback to the light source 10 may be realized by using a lens 30 in addition to the phase matching coupler 12 as shown in FIG. 3. This lens 30 is used to shape the light to provide additional reduction in the power feedback to the light source. The lens 30 is preferably a diffractive surface that is a combination of a lens function having radially symmetric terms with a negative axicon function. When the phase matching coupler 12 is spaced away from the fiber, the lens 30 may simply form a ring, since the phase matching coupler will prevent the light from being retraced. As shown in FIG. 3, the lens 30 is on a first surface 34 of a wafer 32. The phase matching coupler 12 is provided on a second surface 36 of the wafer 32, opposite the first surface. The thickness of the wafer 32 controls the numerical aperture of the image. Alternatively, the phase matching coupler 12 may be formed on the same surface as the lens 30.

The lens 30 allows an annular intensity ring to be optimized for the particular fiber 14. Also, by forming this ring prior to the phase matching coupler 12, a smaller radial segment of the phase matching coupler is used. As can be seen from equation (2), as m increases, the amount of phase twist increases. Thus, rays at the center of the phase matching coupler 12 receive a larger skew angle that rays at the edge of the phase matching coupler. By shaping the light into an annulus, this central portion is avoided, reducing the aberrations introduced by the phase matching coupler 12. Again, the light reflected back from the fiber 14 will not have the same phase as the light incident on the phase matching coupler 12, so the light will be further deflected by the phase matching coupler 12. Since the deflection angles are now altered from that of the light source, the lens 30 will not focus the light back onto the light source, but will further deflect the light away from the light source.

Figure 4:
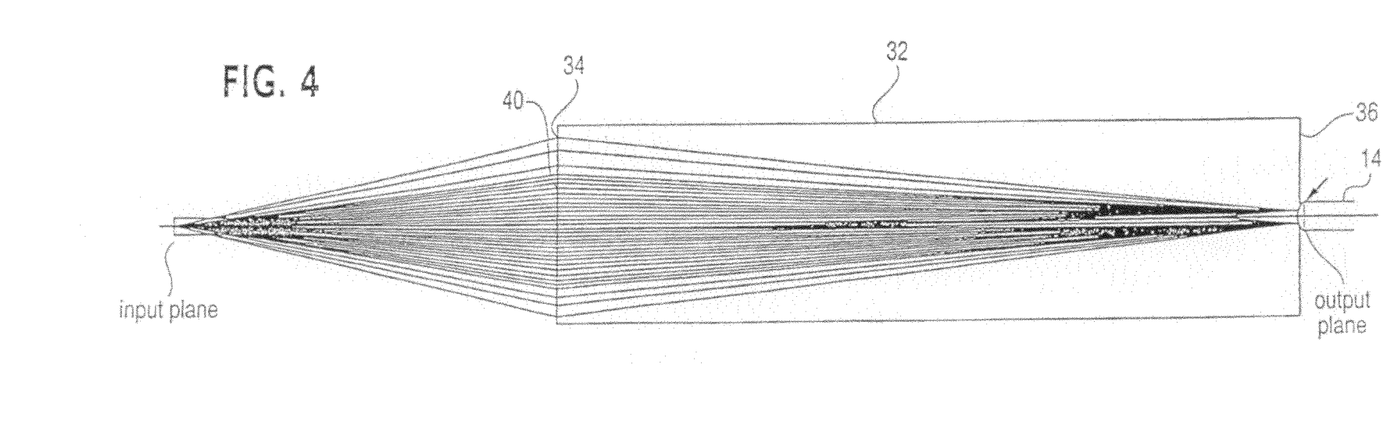
FIG. 4 is a schematic illustration of another embodiment of the coupler.

Another embodiment is shown in FIG. 4. Here, the phase matching coupler 12 is not used, only a reciprocal, phase sensitive system 40. An optical element will map an optical distribution, i.e., amplitude and phase distribution in an input plane to an output plane. If an optical element is a reciprocal optical, it will map the same optical distribution in an output plane back to the original optical distribution in the input plane, as long as the light has the same phase and intensity profile. Optical systems that perform one-to-one mapping, such as an imaging lens, are reciprocal, but are also phase insensitive when performing a mapping between an object plane and an image plane, i.e., a change in phase will not affect the mapping between the image and object planes. However, other optical systems, such as those that perform a one to many mapping, i.e., in which one point in the input plane is mapped to more than one point in the output plane, while reciprocal, are typically phase sensitive. In other words, a phase change will alter how the light in the output plane is returned to the input plane. An example of such a system is a negative axicon.

In the preferred embodiment, this system 40 also creates an intensity ring on the plane at which the fiber 14 is located. The reflection from the fiber creates a ring back onto the system 40, but the phase of the light has been altered due to the reflection. This change in phase results in the light traversing the system 40 having an increased diameter of the ring in the object plane, rather than returning the ring to the point source of the light source. This increased diameter results in most of the light missing the input of the light source, significantly reducing feedback. Any other reciprocal, phase sensitive system that results in most of the light avoiding the light source may be used. The phase matching coupler 12 may still be employed in any position to increase coupling bandwidth and/or enhance the feedback suppression.

Figure 5A:
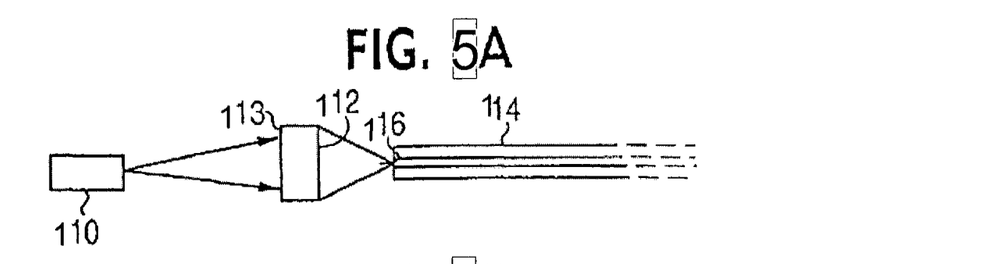
FIG. 5A illustrates a schematic view according to an embodiment.
Figure 5B:
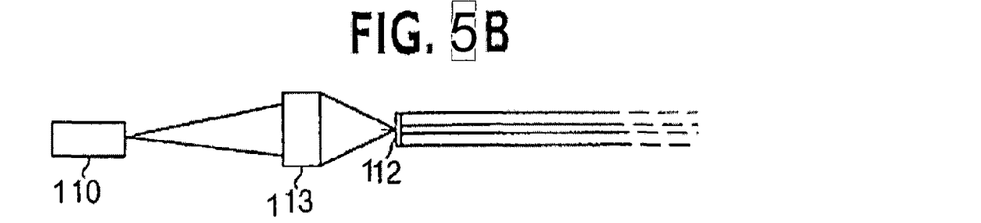
FIG. 5B illustrates a schematic view according to an embodiment.

FIGS. 5A and 5B schematically illustrate different configurations of the multi-mode coupler of the present invention. A light source 110, such as a VCSEL, an edge emitting laser or a single mode fiber, outputs light which is incident on a beam shaper 113 which shapes the beam and an optical element 112 together forming the coupler. The light is then supplied to a core 116 of a multi-mode fiber 114.

The end face of the fiber is typically located near the image plane of the optical system as determined by the focal length of the beam shaper 113 and the object distance, i.e., the distance from the light source 10 to the beam shaper 113. If the fiber 114 is placed substantially further than a depth of focus away from the image plane, then the beam will be bigger than the core 116 of the fiber 114, resulting in less light being coupled to the fiber 114.

The optical element 112 may direct light away from a center of the core 116 of the fiber 114 by, e.g., increasing the angle of light in the center of the beam so that light in the center will be incident on the outer edges of the core 116 of the fiber 114 or by delivering no light to the center of the core. Thus, either no light is delivered to a center 116 of the fiber 114 or any light which is incident on the center 116 of the fiber 114 will be incident at a high enough angle to be coupled into the desired higher order modes.

In addition to the optical element 112, a beam shaper 113 may be provided in either embodiment. The beam shaper 113 may be integrated with the optical element 112 on a same surface or on an opposite surface of the same structure. The beam shaper 113 may also be closely spaced to the optical element 112. As shown in FIG. 5B, the beam shaper 113 may be placed at a specific distance from the light source 110, with the optical element 112 being very close to or even flush with the fiber 114. Each embodiment has attendant advantages and disadvantages as discussed below.

The beam shaper 113 performs a one-to-one mapping from the input plane to the output plane thereof. The performance of the beam shaper may be evaluated using ray tracing. Typically, the beam shaper 113 is used for focusing the beam output by the light source 110, which will usually be on the order of a several hundred microns in the plane of the beam shaper, to a diameter which is smaller than the diameter of the core, which is usually on the order of 50 microns. If the beam shaper is a lens, theoretically, light is focused to a point. But in reality, if the light incident on the lens has a Gaussian profile, the light output from the lens will still have a Gaussian profile. Another useful beam shaper for the coupling of the present invention is a super-Gaussian element. A super-Gaussian element converts an input beam of a particular intensity distribution into a beam with a super-Gaussian distribution, thereby providing a focused output beam having a flatter peak and a much faster fall off to zero than a normal Gaussian beam. Thus, such a beam has a fairly uniform power distribution across the peak, pushing more power to the edges and leaving less in the center as compared to a normal Gaussian. When the optical element serves as an optical profile altering element, the beam shaping and the optical element may be formed on a single surface.

While the ratio between the distance from the light source 110 to the beam shaper and the distance from the beam shaper to the fiber 114 shown in FIGS. 5A and 5B, in which an edge emitting laser is used as the light source, is typically 2:1, when using a VCSEL as the light source 110, this ratio is typically closer to 1:1. The actual ratio will depend on the numerical aperture of the source and the numerical aperture of the fiber. Further, depending upon the desired coupling, the beam incident on the fiber may be smaller than the core or larger than the core. For most applications, source and fibers, the ratio will be between 1:4 and 4:1.

Figure 6:
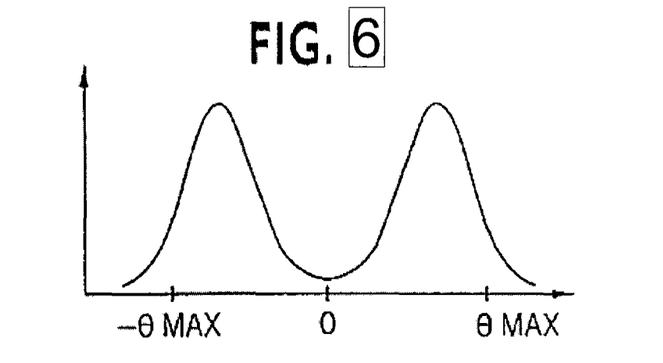
FIG. 6 illustrates a radiation profile of light traversing an embodiment of FIG. 5A or 5B.

There are three primary design approaches for achieving the desired shaping by the optical element 112. The radiation profile of light having traversed a first embodiment of the optical element 112 is shown in FIG. 6. As can be seen in FIG. 6, the radiation profile has been altered by the optical element 112 to be bimodal. This bimodal distribution is Gaussian shaped for each peak, each peak being centered on an absolute angular value between zero and $\theta$max, where $\theta$max is the critical angle for the multi-mode fiber 114.

In the first design, the optical element 112 is a diffractive diffuser which diffuses, i.e., substantially each point of light incident on the diffuser substantially contributes to substantially every point of light in the output plane, the light into the desired angular distribution. The angles will all be less than the critical angle for the fiber 114. Thus, if there is change in the output profile of the light from the light source, which is of particular concern when using a VCSEL as the light source 110, the coupling to the multi-mode fiber will not be affected. Additionally, if the diffractive diffuser does not also provide collimation or focusing to the light, precise alignment of the diffractive diffuser is not needed.

A diffractive diffuser may be formed by setting the fast Fourier transform (FFT) to be a ring, i.e., set the fringe period of the diffractive between the two values bounding the ring. In order for the diffractive diffuser serving as the optical element 112 to function properly, it must be positioned at least more than a width of the core, preferably at least three to five times the width of the core, away from the fiber. This placement ensures that substantially every point of light incident on the diffuser substantially contributes to substantially all of the pattern incident on the fiber. Such a Fourier transform diffractive diffuser may be realized in accordance with U.S. Pat. No. 5,850,300, which is hereby incorporated by reference in its entirety.

The diffractive diffuser preferably alters the angular distribution of the light into any desired angular distribution which will efficiently coupler the light into the higher order modes of the multi-mode fiber. This desired angular distribution will typically be a ring, an annulus or a grid of N spots, but may be any other desired angular distribution for a particular multi-mode fiber. For example, a radial grating may be provided which sends a significant portion of the light, e.g., 80%, into the ±1 order and randomly varies the period to provide the range of desired angles radially away from the center. Further, a ring or a multipole of N spots, e.g. a quadrupole of 4 spots, where N is an integer greater than or equal to one, may be realized by providing a grating to create spots located at $r_N$, where $r_N$ is a distance from the center to the spot. Additionally, the diffractive diffuser may be a binary element which splits the light into two beams directed to the periphery of the fiber core.

While a Fourier transform diffractive diffuser as described above is useful when employing a light source having an unstable output beam profile, this diffractive diffuser is difficult to use in the configuration of FIG. 5B, since the optical element 112 is too close to the fiber 114 for a Fourier transform diffractive diffuser to create, for example, a ring on the end face of the fiber. If the optical element 112 is more than a few wavelengths away from the end of the fiber, a diffuser serving as the optical element 112 will function properly. Additionally, diffusers often have lower efficiencies than other optical elements. The following two designs may be used with either configuration of FIGS. 5A and 5B.

Figure 7:
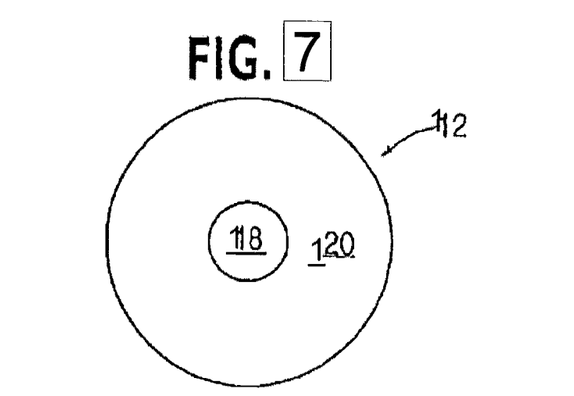
FIG. 7 illustrates another embodiment of the optical element.

A generic embodiment of the second design is illustrated in FIG. 7. As can be seen therein, the optical element 112 is composed of a central region 118 and a peripheral region 120. The central region 118 and the peripheral region 120 affect the beam incident thereon differently. These different regions may be discretely different, include subregions of different functioning, and/or may continuously vary the treatment of the light from the center to the periphery. For example, the central region 118 deflects the light incident thereon away from the center. The peripheral region 120 may not affect the light incident thereon at all, or it may be designed to, for example, collimate the light incident thereon. Using such an element allows the light in the center of the beam which would have been incident on the center of the fiber to be deflected away to edges of the fiber, while not imposing an increase in the angle on the light near the edge of the beam which would already be incident upon the desired portion of the fiber. Alternatively, although not as efficiently, the central region may simply block the light incident thereon to form the desired ring shape.

Figures 8A, 8B, 9:
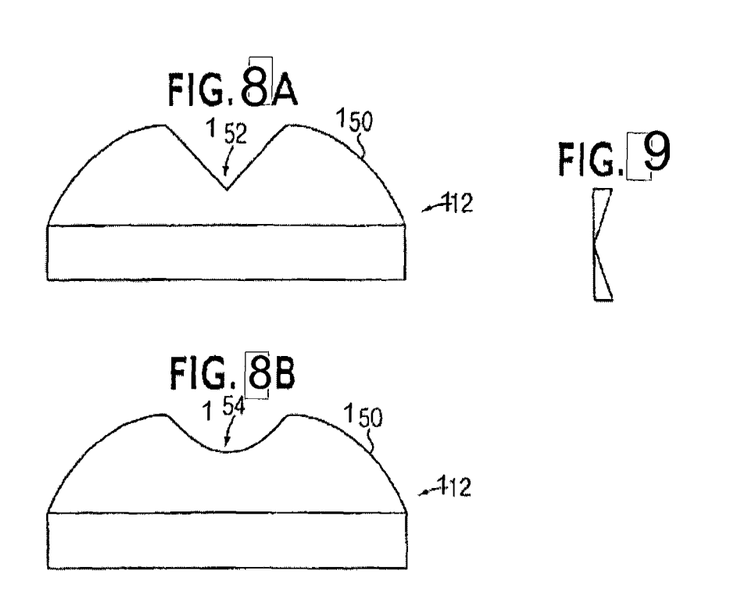
FIGS. 8A, 8B and 9 illustrate other embodiments of the optical element and/or beam shaper.

A specific embodiment of the second design is illustrated in FIG. 8A. The optical element 112 provides a one to one mapping of each point to the fiber, while continuously varying the element encountered by the light from the center to the periphery. A converging portion 150 of the coupler 112 converges, i.e., reduces the incident angle, of light at the outer edge of the beam. A diverging prism 152 of the optical element 112 diverges, i.e., increases the angle of the light, of light in the center of the beam to prevent light from hitting the center of the fiber. Another specific embodiment of one to one mapping is shown in FIG. 8B in which a diverging portion 154 is located in the center of the optical element again to diverge light in the center of the beam. FIGS. 8A and 8B are radially symmetric.

Another specific embodiment of the second design is shown in FIG. 9. FIG. 9 is a cross-section of a prism. If this cross-section is used to form a linear prism, such that there is a variation in thickness along the axis coming out of the plane of the page, two spots will be generated in the image plane of the system. When a linear prism is combined with a lens function, the cross-section will look like FIG. 8B, but will not be radially symmetric, since the linear prism is not radially symmetric. If the cross-section in FIG. 9 is rotated radially to form a radial prism, a ring will be generated in the image plane of the system. If the radial prism is combined with a lens function, the cross-section will look like FIG. 8B and will be radially symmetric.

In the embodiments of the second design, light near the edge of the beam can be mapped to the edge of the fiber with little or no increase in the angle. Light from the center of the beam can be mapped to the edges of the fiber. Where the optical element 112 is illustrated as a refractive element in the embodiments of the second design, the optical element 112 may be designed as a diffractive element using the known diffractive approximation of the refractive element, either as a continuous diffractive or as a discrete diffractive. Preferably, the diffractive elements are computer generated holograms.

The same effect as provided by configurations of the second design may be realized by providing an optical element having diffuser patches having finer features and/or smaller periods closer to the center and larger features and/or larger periods towards the periphery or nothing at the periphery. At the edge of the element the light is not affected, or has a small increase in angle, and the light at the center is diffused to increase the angle of light towards the center. As long as the diffuser patches are distributed on the optical element so that it does not treat the center and the periphery in the same manner, e.g., a diffuser only at the center or a gradient diffuser, the diffuser patches may be used next to the end face of the fiber, such as shown in FIG. 5B. Such diffusing patches may also be multiplexed with any desired lens function.

Further, while the embodiments of the second design have been discussed with reference to the optical element 112, the second design may also be used as the beam shaper with the optical element of the first design or the optical element of the third design, discussed above. Further, when using a diffractive diffuser which splits the light into two beams directed to the periphery of the fiber core, this element does not have to be unitary, but may be split into half. In such a configuration, the two elements serve as a beam shaper, with one half mapping the light incident thereon to one point and the other half mapping the light incident thereon to another point.

The above discussion has assumed that the ideal radiation pattern for coupling light into the fiber is a ring. Generally, the ideal radiation pattern, and hence the desired angular distribution, will be a function of the properties of the fiber, i.e., where propagation is most efficient. The design of the coupler for achieving the desired angular distribution will also depend on the radiation profile output by the light source used to illuminate the fiber.

Any of the above designs may be integrated with other optical functions, such as collimation, in a single element, as shown in FIGS. 8A, 8B and 9. For the integration of the coupler with additional optical functioning, the additional functioning may be multiplexed with the shaping function, as disclosed in commonly assigned, co-pending application U.S. patent application Ser. No. 09/296,397 filed Apr. 23, 1999, entitled "Diffusing Imager and Associated Methods" which is hereby incorporated by reference in its entirety. Further, any of the above designs may be integrated with the other elements of the light source/fiber system, including further optical elements as discussed above.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

What is claimed is:

1. A method for transmitting a signal in an optical system, the method comprising:
    generating an optical signal along an optical axis for transmission through an optical element;
    positioning the optical element so that a surface discontinuity is positioned along the optical axis such that the optical signal defines a substantially radially symmetric intensity profile; and
    launching the optical signal into an input face of an optical fiber such that the intensity profile is substantially null proximate an optical axis associated with the optical fiber, wherein the optical axis of the optical element and the optical axis of the optical fiber at the input face are aligned.

2. The method as recited in claim 1, wherein an axicon function is provided with respect to the optical signal via the surface discontinuity.

3. The method as recited in claim 1, wherein the relative minimum of the incident field amplitude of the intensity profile is located proximate a center of the intensity profile.

4. The method as recited in claim 1, wherein the intensity profile is substantially symmetric about the relative minimum of the incident field amplitude.

5. The method as recited in claim 1, wherein the intensity profile is substantially annular.

6. A method for transmitting a signal in an optical system, the method comprising:
    generating an optical signal along an optical axis for transmission through an optical element;
    positioning the optical element so that a surface discontinuity is positioned along the optical axis such that the optical signal defines a substantially annular intensity profile; and
    launching the optical signal into an input face of an optical fiber such that the intensity profile is substantially null proximate an optical axis associated with the optical fiber.

* * * * *